T. B. FORD.
AUTOMATIC RETURN CHECK AND STOP VALVE.
APPLICATION FILED SEPT. 10, 1915.
1,178,307.
Patented Apr. 4, 1916.
2 SHEETS—SHEET 1.
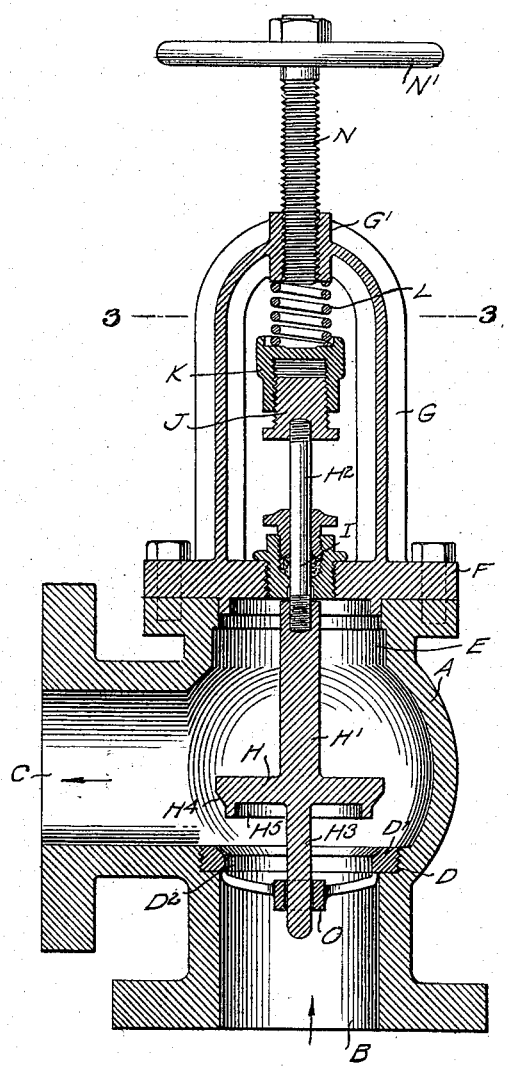
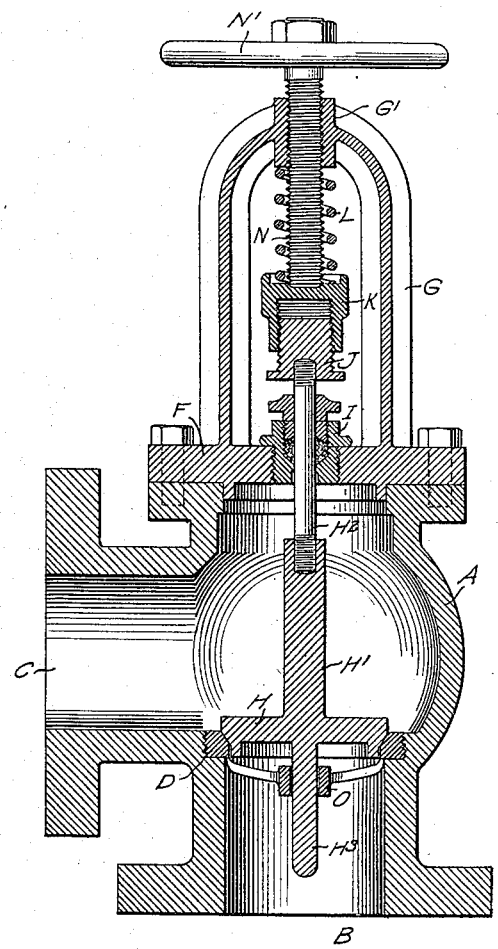
WITNESSES
INVENTOR
Thomas B. Ford
BY
ATTORNEYS T. B. FORD.
AUTOMATIC RETURN CHECK AND STOP VALVE.
APPLICATION FILED SEPT. 10, 1915.
1,178,307.
Patented Apr. 4, 1916.
2 SHEETS—SHEET 2.
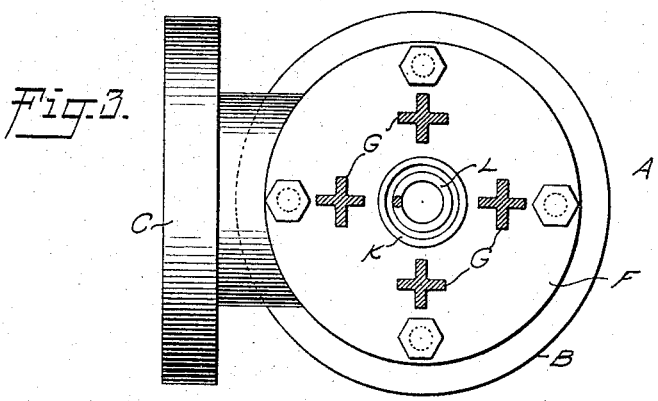
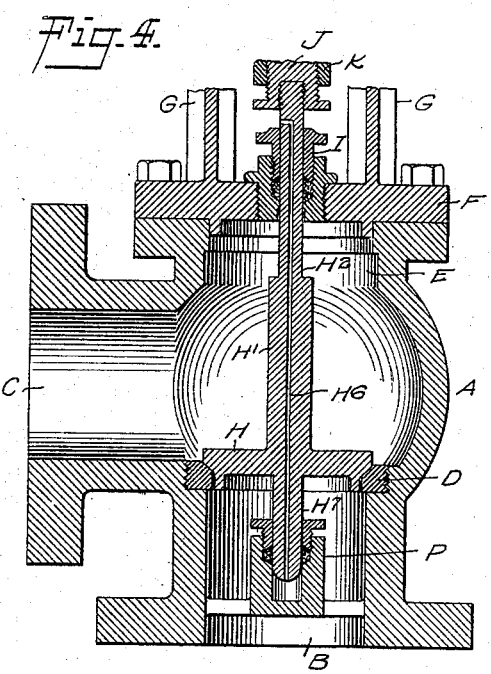
WITNESSES
INVENTOR
Thomas B. Ford
BY
ATTORNEYS

UNITED STATES PATENT OFFICE.

THOMAS BURTON FORD, OF NEW YORK, N. Y.

AUTOMATIC RETURN-CHECK AND STOP-VALVE.

1,178,307.  Specification of Letters Patent.  Patented Apr. 4, 1916.

Application filed September 10, 1915. Serial No. 49,900.

*To all whom it may concern:*

Be it known that I, THOMAS B. FORD, a citizen of the United States, and a resident of the city of New York, borough of Brooklyn, in the county of Kings and State of New York, have invented a new and Improved Automatic Return-Check and Stop-Valve, of which the following is a full, clear, and exact description.

The invention relates to valves used in steam pipes and its object is to provide a new and improved automatic return check and stop valve arranged to prevent sticking and chattering, to dispense with the dash pot, to permit convenient adjustment for operating at slight differences of boiler and main pressures, and to provide a visible means for the attendant in charge to see whether the valve is properly working or not.

In order to accomplish the desired result, use is made of a valve body having a seat intermediate the inlet and outlet, a disk valve adapted to be seated on the said seat and having the stem extending through a stuffing box in the valve body to the outside thereof to reduce the effective upper area of the valve on which pressure can act so that the valve tends to move into open position. Use is also made of a spring seat on the outer end of the said valve stem, a spring bearing on the said spring seat, and a screw rod adapted to pass through the opening in the spring to engage the said spring seat with a view to manually move the valve to its seat and hold it locked thereon.

A practical embodiment of the invention is represented in the accompanying drawings forming a part of this specification, in which similar characters of reference indicate corresponding parts in all the views.

Figure 1 is a longitudinal central section of the valve in open working position; Fig. 2 is a similar view of the same in closed position; Fig. 3 is a sectional plan view of the same on the line 3—3 of Fig. 1; and Fig. 4 is a sectional side elevation of a modified form of the valve.

The valve body A is provided with an inlet B connected with the boiler and with an outlet C connected with the pipe line. Intermediate the inlet B and the outlet C is arranged a valve seat D and directly opposite this valve seat and in the top of the casing A is arranged an opening E normally closed by a cap F provided with a yoke or standard G. A disk valve H is adapted to be seated on the valve seat D and the said disk valve H is provided with a stem H' extending upwardly and having a reduced portion H² passing through a stuffing box I arranged in the cap F. By extending the stem H² to the outside the effective upper area of the valve H upon which pressure can act is correspondingly reduced so that the valve H tends to move into open position. On the upper outer end of the reduced portion H² of the valve stem is secured a head J provided with an external screw thread on which screws a spring seat K recessed at the top for the reception of the lower end of a spring L abutting with its upper end on a nut G' formed on the yoke or standard G. The spring L is adjusted to offer a desired resistance to the opening tendency of the valve. In the nut G' screws a screw rod N provided with a handle N' and adapted to pass through the opening in the spring L to engage the seat K with a view to permit of manually moving the valve H to its seat D and to hold it locked thereon, as will be readily understood by reference to Fig. 2. The screw rod N is normally in withdrawn position, as shown in Fig. 1, to allow the valve H to open on account of the difference in areas as above described, so that the steam can pass from the boiler by way of the inlet B and valve seat D to the outlet C and the pipe line. It is understood that when the steam pressure on the inlet side of the valve decreases the valve H moves to its seat D by the difference in the areas and aided by the action of the spring L. By mounting the spring seat K adjustably on the head J the tension of the spring can be adjusted to insure a flow of the steam from the boiler to the pipe line at even pressures or boiler pressure at any given small excess over the main pressure that may be desired. It is understood that when the valve is in operation the reduced end H² of the valve stem moves up and down according to the variation in the pressures so that the attendant can readily see at any time whether the valve is properly working or not. When it is desired to properly close the disk valve H, the operator turns the screw rod N to engage the latter with the seat K and to force the latter and consequently the valve H downward until the valve is seated on the seat D.

In order to guide the valve H in its up and down movement a short stem H³ extends downward from the valve and slidingly engages a bearing O supported by a spider from the seat D. The disk valve H is preferably provided with a conical portion H⁴ and a cylindrical flange H⁵ adapted to engage correspondingly shaped portions D′, D² on the valve seat D. It will be noticed that the valve is unbalanced and hence does not tend to chatter, and by providing the flange or apron H⁵ the valve H has to move upward a corresponding distance so that the conical portion H⁴ is quite a distance removed from the conical portion D′ to prevent wire drawing.

If desired, a leak channel H⁶ is formed through the valve and its stem, as plainly indicated in Fig. 4, the lower portion H⁷ of the stem extending in a stuffing box P arranged in the inlet B of the valve body A. The upper end of the channel H⁶ opens to the atmosphere whether the valve is open or closed so that any leakage in the stuffing box P can pass through the channel H⁶ to the outside.

Having thus described my invention, I claim as new and desire to secure by Letters Patent:

1. A return check and stop valve, comprising a valve body having an inlet, an outlet, and a valve seat intermediate the said inlet and outlet, a cap on the valve body directly opposite the valve seat, a stuffing box on the said cap, a disk valve adapted to be seated on the said valve seat and having a stem provided with a reduced portion extending through the stuffing box to the outside of the valve body to reduce the effective upper area of the valve on which pressure can act so that the valve tends to move into open position, a spring seat on the outer end of the reduced portion of the valve stem, a spring bearing on the said spring seat to move the disk valve toward its seat, and a screw rod adapted to pass through the opening of the spring to engage the said spring seat for moving the disk valve onto its seat and hold it thereon.

2. A return check and stop valve, comprising a valve body having an inlet, an outlet, and a valve seat intermediate the said inlet and outlet, a cap on the valve body directly opposite the said valve seat, a yoke rising from the said cap, a stuffing box on the said cap, a disk valve adapted to be seated on the said valve seat and having a stem extending through the said stuffing box, a head on the outer end of the said valve stem, a spring seat adjustable on the said head, and a spring seated at one end on the said spring seat and abutting at its other end on the said yoke.

3. A return check and stop valve, comprising a valve body having an inlet, an outlet, and a valve seat intermediate the said inlet and outlet, a cap on the valve body directly opposite the said cap, a yoke rising from the said cap, a stuffing box on the said cap, a disk valve adapted to be seated on the said valve seat and having a stem extending through the said stuffing box, a head on the outer end of the said valve stem, a spring seat adjustable on the said head, a spring seated at one end on the said spring seat and abutting at its other end on the said yoke, and a screw rod screwing in the said yoke and adapted to pass through the opening in the spring to engage the said spring seat.

4. A return check and stop valve, comprising a valve body having an inlet, an outlet, and a valve seat intermediate the said inlet and outlet, the valve seat having a conical portion and a cylindrical portion, a disk valve having a conical portion and a cylindrical portion adapted to engage the conical and cylindrical portions of the valve seat, a cap on the valve body, a stuffing box on the said cap, the said disk valve having a stem extending through the stuffing box to the outside of the valve body, a member adjustable on the outer end of said stem, and a spring bearing on the said member to move the disk valve to its seat.

5. A return check and stop valve, comprising a valve body having an inlet, an outlet, a valve seat intermediate the said inlet and outlet, and an opening in the valve body directly opposite the valve seat, a cap normally closing said opening, a yoke on said cap, a nut formed on the said yoke, a disk valve adapted to be seated on the said valve seat, a stem for the said valve having a reduced portion extending through the said cap to the outside of the valve body, a head secured on the reduced outer end of the valve stem and provided with an external screw thread, an adjustable member screwing on the said head and recessed at its outer end to form a seat, a spring seated at one end in said seat and bearing at its other end on the said nut, and a screw rod screwing in the said nut and adapted to pass through the opening in the spring to engage the said seat.

6. A return check and stop valve comprising a valve body having an inlet, an outlet and a valve seat intermediate the said inlet and outlet, a closure for the top of the valve body provided with an upwardly extending yoke, a nut formed on said yoke, a disk valve adapted to be seated on the valve seat, a stem for said valve having a reduced portion extending through the closure to the outside of the valve body, a member adjustable on the outer end of the said stem and having a seat at its outer end, a spring seated in the said seat and engaging the nut on the yoke, and a screw rod screwing in the said nut and engaging the said seat of the adjustable member.

In testimony whereof I have signed my name to this specification in the presence of two subscribing witnesses.

THOMAS BURTON FORD.

Witnesses:
 THEO. G. HOSTER,
 GEORGE H. EMSLIE.

Copies of this patent may be obtained for five cents each, by addressing the "Commissioner of Patents, Washington, D. C."